(12) United States Patent
Castor

(10) Patent No.: US 8,540,847 B2
(45) Date of Patent: Sep. 24, 2013

(54) METHODS AND APPARATUS FOR PROCESSING CELLULOSIC BIOMASS

(75) Inventor: Trevor Percival Castor, Arlington, MA (US)

(73) Assignee: Aphios Corporation, Woburn, MA (US)

( * ) Notice: Subject to any disclaimer, the term of this patent is extended or adjusted under 35 U.S.C. 154(b) by 87 days.

(21) Appl. No.: 13/198,355

(22) Filed: Aug. 4, 2011

(65) Prior Publication Data

US 2011/0287502 A1    Nov. 24, 2011

Related U.S. Application Data

(63) Continuation-in-part of application No. 12/154,398, filed on May 22, 2008, now abandoned.

(51) Int. Cl.
*D21F 1/66* (2006.01)
*C12P 7/52* (2006.01)

(52) U.S. Cl.
USPC ............ 162/264; 162/380; 435/141; 435/165

(58) Field of Classification Search
USPC .......................... 435/141, 165; 162/264, 380
See application file for complete search history.

(56) References Cited

U.S. PATENT DOCUMENTS

| | | | |
|---|---|---|---|
| 4,493,797 A | 1/1985 | Avedesian | |
| 5,170,727 A | 12/1992 | Nielsen | |
| 5,288,619 A | 2/1994 | Brown et al. | |
| 5,380,826 A | 1/1995 | Castor et al. | |
| 2002/0155177 A1 | 10/2002 | Krasutsky et al. | |
| 2007/0161095 A1 | 7/2007 | Gurin | |
| 2007/0225514 A1* | 9/2007 | Davis et al. | 554/9 |
| 2009/0227003 A1* | 9/2009 | Blotsky et al. | 435/257.1 |

FOREIGN PATENT DOCUMENTS

WO    WO2011021208    * 2/2011

* cited by examiner

*Primary Examiner* — Jacob Thomas Minskey
(74) *Attorney, Agent, or Firm* — Pearl Cohen Zedek Latzer, LLP

(57) ABSTRACT

Embodiments of the present invention are directed to apparatus and methods for the substantially continuous processing of cellulosic biomasses with a supercritical, critical or near critical fluid to produce ethanol, bio-fuels and high value end products.

26 Claims, 1 Drawing Sheet

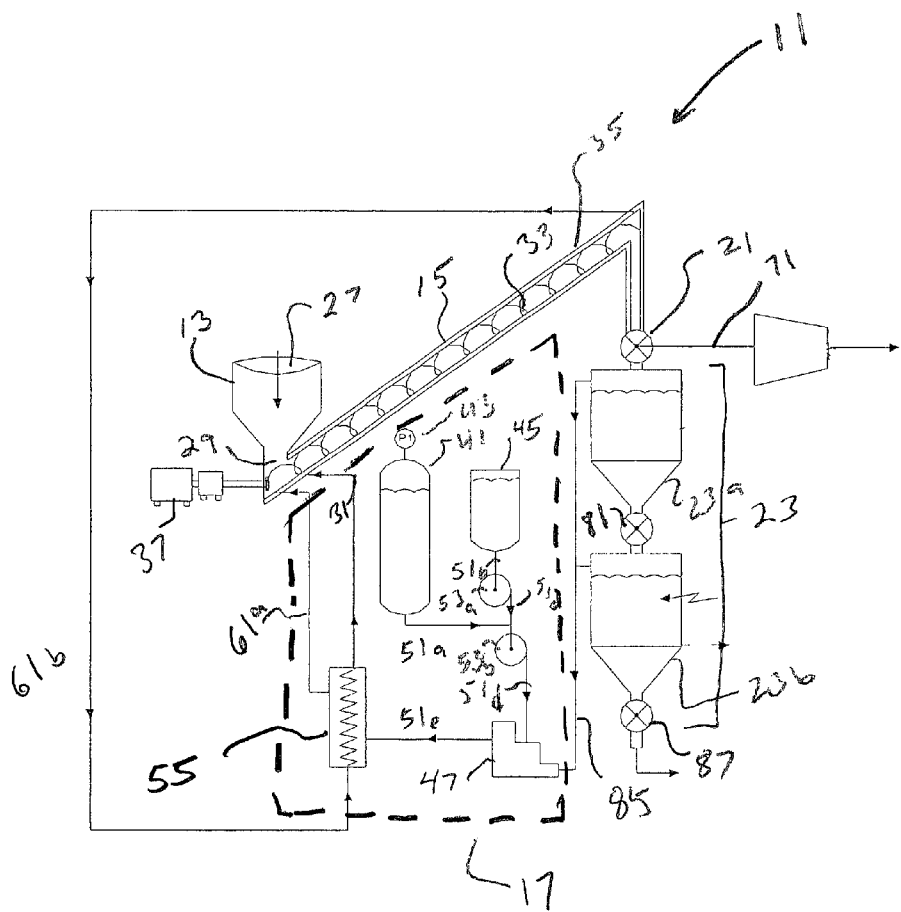

METHODS AND APPARATUS FOR PROCESSING CELLULOSIC BIOMASS

CROSS-REFERENCE TO RELATED APPLICATIONS

This application is a continuation in part of U.S. non-provisional patent application Ser. No. 12/154,398, filed May 22, 2008 now abandoned, entitled "Pretreating Cellulosic Biomass," the entire contents of which are incorporated by reference herein.

GOVERNMENT SUPPORT

This invention was supported in part by Grant Number 90-33610-5111 from the United States Department of Agriculture.

FIELD OF INVENTION

The present invention relates to methods and apparatus for the processing cellulosic biomass into ethanol and other bio-fuels and wood-based chemicals and materials. Cellulosic biomass comprises newsprint and other paper products, wood chips and the like.

BACKGROUND OF THE INVENTION

Biomass resources are currently underutilized. These resources can be used to create renewable energy and new materials for industry and agriculture. However, these biomass resources are difficult to process into ethanol, bio-fuels, wood-based chemicals and other higher value materials. The solid nature of the cellulosic materials creates problems in continuous processes, particularly, in processes involving pressurized gases.

SUMMARY OF THE INVENTION

Embodiments of the present invention feature apparatus and processes which receive cellulosic biomass materials in a continuous or near continuous process to produce ethanol, bio-fuels, wood-based chemicals and higher value materials.

As used herein, the term "cellulosic biomass" refers to plant material or material substantially originating from plant material, such as by way of example wood, paper, cardboard, particle board, agricultural plant derived waste and the like. The term bio-fuels refers to materials which in and of themselves can be used in combustion-type reactions to produce energy and are derived from biological sources. Wood-based chemicals include, but are not limited to, pulping liquors, sulphonated lignins, tall oils, turpentines, waxes, natural rubbers, rosins and the like. Higher value materials comprise cellulosic fibers, and cellulose for feed, cosmetics and industrial applications.

One embodiment of the present invention is directed to an apparatus for processing cellulosic biomass to make ethanol and/or one or more bio-fuels, wood-based chemical and higher value materials. The apparatus comprises at least one first vessel having at least one opening for receiving a cellulosic biomass and discharging a cellulosic biomass. The apparatus further comprises conveying means in fluid communication with the at least one first vessel for receiving cellulosic biomass stored in the at least one first vessel. The conveying means engages the first vessel to prevent substantial discharge of a gas held under pressure to form a cellulosic biomass laden with a supercritical, critical or near critical fluid. The apparatus further comprises supercritical, critical or near critical fluid means in fluid communication with the conveying means, for placing the cellulosic biomass held in conveying means in the presence of a supercritical, critical or near critical fluid. The supercritical, critical or near critical fluid is carbon dioxide and entrainers and modifiers. The apparatus further comprises discharge means in fluid communication with the conveying means for receiving the cellulosic biomass laden with the supercritical, critical or near critical gas, and discharging the gas to form a disrupted cellulosic biomass. The apparatus further comprises at least one second vessel in fluid communication with the discharge means for receiving the disrupted cellulosic biomass and performing at least one processing step selected from the group consisting of hydrolysis and fermentation. The processing step forms carbon dioxide, and at least one product selected from the group consisting of ethanol and/or a bio-fuel, wood-based chemical and higher value materials. The vessel has at least one opening for discharging the product and at least one gas discharge opening for discharging carbon dioxide.

As used herein, the term conveying means refers to a conduit which due to its construction and orientation allows solids, liquids and the like to flow from the first vessel to the discharge means. For example, the construction and orientation may allow solids and liquids to flow via gravity. Preferably, the construction and orientation provides a mixing of the solids, liquids and supercritical, critical or near critical fluid. One embodiment of the present invention features construction and orientation in the form of one or more augers arranged in a conduit. Another embodiment features one or more movable belts, paddles, stirrers and mixers.

As used herein, the term "supercritical, critical or near critical fluid means" refers apparatus comprising a source of carbon dioxide and additives such as entrainers and modifiers to impose conditions to make the gaseous mixture a supercritical, critical or near critical fluid. Conditions to make a gas and/or gaseous mixture, such as a gas in which an entrainer or modifier has been added, a supercritical, critical or near critical fluid are known in the art and involve placing the gas or gaseous mixture under pressure, and/or at a temperature or a combination of temperature and pressure. Embodiments of the present invention feature apparatus wherein said supercritical, critical or near critical fluid means comprises a source of entrainers and/or modifiers. One entrainer and/or modifier is ethanol.

As used herein, the term "discharge means" refers to a valve or outlet for rapidly reducing the pressure of a supercritical, critical or near critical fluid. One embodiment of the present invention features apparatus wherein the discharge means is in fluid communication with turbine means for providing kinetic energy. The kinetic energy is used to power an electric generator.

One embodiment of the present invention features an apparatus wherein the second vessel gas discharge opening is in fluid communication with a gas recycling means for receiving the gas discharged in the second vessel and returning the gas to supercritical, critical or near critical conditions for re-entry into the conveying means. Thus, the gas recycling means is in fluid communication with the supercritical, critical or near critical fluid means. For example, one gas recycling means comprises a compressor.

One embodiment of the present invention features a supercritical, critical or near critical fluid source in thermal communication with a thermal exchanger for heating or cooling the carbon dioxide to a desired supercritical, critical or near critical condition. One embodiment features an apparatus wherein the conveying means receives thermal energy from the thermal exchanger.

One embodiment of the present apparatus features at least one second vessel for receiving the disrupted cellulosic biomass and performing at least one processing step. The at least one second vessel comprises a digestion vessel in fluid communication with a fermentation vessel. The digestion vessel is for performing an enzymatic hydrolysis step on the disrupted cellulosic biomass to produce a digested biomass and cellulosic sugars. The fermentation vessel is for receiving at least one of the cellulosic sugars or digested biomass to produce at least one product such as ethanol, a bio-fuel, a wood-based chemical and higher value material.

One embodiment features as apparatus wherein the at least one first vessel comprises at least two first vessels which first vessels are alternating in communication with the conveying means. This construction and arrangement allows one first vessel to receive a cellulosic biomass while one first vessel is discharging cellulosic biomass to conveying means.

A further embodiment of the present invention is directed to a method of making ethanol and/or one or more bio-fuels, wood-based chemicals and higher value materials from a cellulosic biomass. The method comprising the steps of providing at least one apparatus having a first vessel, conveying means, supercritical, critical or near critical fluid means, discharge means, and at least one second vessel as previously described. The method further comprising the step of holding a cellulosic biomass in the at least one first vessel, discharging a cellulosic biomass to conveying means and forming a cellulosic biomass laden with a supercritical, critical or near critical fluid. The supercritical, critical or near critical fluid is selected from the group of gases comprising carbon dioxide and entrainers and modifiers. The method further comprises the step of discharging the gas from the cellulosic biomass laden with a supercritical, critical or near critical fluid to form a disrupted cellulosic biomass. Processing the disrupted biomass, by at least one step of hydrolysis or fermentation, to form at least one product selected from the group consisting of ethanol and/or a bio-fuel, wood-based chemical and higher value materials. And, the method comprises the step of discharging the product from the at least one second vessel.

One embodiment of the present method features a second vessel gas discharge opening in fluid communication with a gas recycling means for receiving said gas formed or carried into the second vessel and returning the gas to supercritical, critical or near critical conditions for re-entry into the conveying means. The method further comprises the step of recycling such gas. For example, without limitation, embodiments of the present invention feature gas recycling means such as a compressor and the method further comprises the step of compressing the carbon dioxide.

Embodiments of the present method feature a supercritical, critical or near critical fluid source in thermal communication with a thermal exchanger for heating or cooling the carbon dioxide to a desired temperature to attain supercritical, critical or near critical conditions. One embodiment of the present method uses such thermal energy to attain or maintain supercritical, critical or near critical conditions in the conveying means.

Embodiments of the present method feature a supercritical, critical or near critical fluid having entrainers and/or modifiers. One entrainer and/or modifier is ethanol which is obtained from the process.

One embodiment features discharge means coupled to turbine means for providing kinetic energy. The turbine means is used to power an electric generator which electrical power is used to power aspects of the apparatus.

One embodiment of the present method features at least one second vessel for receiving the disrupted cellulosic biomass and performing at least one processing step. In one embodiment the at least one second vessel and processing step comprises a digestion vessel in fluid communication with a fermentation vessel. The digestion vessel is for performing an enzymatic hydrolysis step on the disrupted cellulosic biomass to produce a digested biomass and cellulosic sugars. The fermentation vessel is for receiving at least one of the cellulosic sugars or digested biomass to produce at least one of the group consisting of ethanol, a bio-fuel, a wood-based chemical and higher value material.

One embodiment of the present method features at least two first vessels which first vessels are alternating in communication with said conveying means. The alternating first vessels allow one first vessel to receive a cellulosic biomass while one first vessel is discharging cellulosic biomass to conveying means.

Thus, embodiments of the present invention feature a substantially non-toxic supercritical, critical or near critical fluid featuring carbon dioxide which is recycled to reduce emissions which add to the green house gas load of the atmosphere. The process and apparatus are capable of substantially continuous operation reducing inefficiencies of batch processes and apparatus.

These and other features and advantages will be apparent upon viewing the figures and reading the detailed description that follow.

BRIEF DESCRIPTION OF THE FIGURES

FIG. 1 depicts an apparatus having features of the present invention.

DETAILED DESCRIPTION OF THE INVENTION

Embodiments of the present invention will be described in reference to an apparatus for processing cellulosic biomass to make ethanol and/or one or more bio-fuels, wood-based chemical and higher value materials. The description is considered to the preferred embodiments of the invention and those skilled in the arts will recognize that the features described can be modified or substituted without departing from the teaching. Therefore, this description should not be considered limiting.

Embodiments of the present invention feature the use of supercritical, critical or near critical fluids. A compound becomes critical at conditions that equal both its critical temperature and critical pressure. A compound becomes supercritical at conditions that equal or exceeds both its critical temperature and critical pressure. As used herein, the term near critical is used to denote a compound that approaches one or both critical temperature and critical pressure, but is not a critical or supercritical fluid. These parameters are intrinsic thermodynamic properties of all sufficiently stable pure compounds and mixtures. Carbon dioxide, for example, becomes a supercritical fluid at conditions that equal or exceed its critical temperature of 31.1° C. and its critical pressure of 72.8 atm (1,070 psig). As a supercritical fluid, normally gaseous substances, such as carbon dioxide, become dense phase fluids that have been observed to exhibit greatly enhanced solvating power.

At a pressure of 3,000 psig (20 atm) and a temperature of 40° C., carbon dioxide has a density of approximately 0.8 g/cc and exhibits properties similar to those of a nonpolar solvent such as hexane, having a dipole moment of zero Debyes. A supercritical, critical or near critical fluid has a wide spectrum of solvation power, as its density is strongly dependent upon temperature and pressure. Temperature changes of tens of degrees or pressure changes by tens of atmospheres can change a compound's solubility in a supercritical, critical or near critical fluid by an order of magnitude or more. Temperature and pressure allow the fine-tuning of solvation properties and the fractionation of mixed solutes. The selectivity of nonpolar supercritical, critical and near critical fluids can be influenced by the addition of compounds known as modifiers, entrainers and co-solvents. These modifiers are typically more polar, such as acetone, ethanol and methanol.

Turning now to FIG. 1, an apparatus embodying features of the present invention, generally designated by the numeral 11, is depicted. Apparatus 11 receives cellulosic biomass materials in a continuous or near continuous process to produce ethanol, bio-fuels, wood-based chemicals and higher value materials.

Apparatus 11 is comprised of the following major elements: a first vessel 13, conveying means 15, supercritical, critical or near critical fluid means 17, discharge means 21, and at least one second vessel 23a and 23b. Apparatus 11 may be made in any desired size or scale. Typical operating temperatures and pressures are in the order of 3000 psig and 60° C. such that components of apparatus 11 are typically made of steel, stainless steel or other similar materials and alloys.

The apparatus 11 has at least one first vessel 13. Apparatus 11 may have a plurality of first vessels 13 (only one is shown) to allow first vessels 13 to be loaded and discharged sequentially with one first vessel 13 being loaded and a second first vessel 13 being emptied. First vessel 13 has at least one opening 27 for receiving a cellulosic biomass and an opening 29 for emptying a cellulosic biomass. Opening 27 may be equipped with a lid [not shown] to allow pressurization of the first vessel 13. In the alternative, opening 29 has a valve [not shown] or is equipped with a plate [not shown] to allowing closure and pressurization of the downstream apparatus.

Conveying means 15 is in fluid communication with the at least one first vessel 13 for receiving cellulosic biomass held in the at least one first vessel 13. The conveying means 15 engages the first vessel 13 to prevent substantial discharge of a gas held under pressure by the use of a valve or lid or plate, as previously described, to form a cellulosic biomass laden with a supercritical, critical or near critical fluid. This cellulosic biomass laden with a supercritical, critical or near critical fluid is formed in either the first vessel 13 or in the conveying means 15 or both. As depicted, conveying means 15 is in fluid communication with supercritical, critical or near critical fluid means 17 by conduit 31.

Conveying means 15 may take several forms. By way of example, without limitation, conveying means 15 may comprise one or more augers or screws held in a pipe or conduit, such as auger 33 and pipe 35 as depicted in FIG. 1. One embodiment of the present invention features twin augers which are preferably self sweeping [not shown] to avoid plugging. In the alternative, the pipe 35 may be constructed and arranged for gravity feed of materials. In order to promote mixing, pipe 35 may be equipped with berms or obstructions [not shown] to promote a tumbling action. In the further alternative, conveying means 15 may comprise one or more rotating belts, paddles, stirrers and sweeps [not shown]. Auger 33 is powered by motor assembly 37.

Supercritical, critical or near critical fluid means, generally designated by the numeral 17, is in fluid communication with the conveying means 15, for placing the cellulosic biomass held in conveying means 15 in the presence of a supercritical, critical or near critical fluid. Supercritical, critical or critical fluid means 17 is an assembly of elements, the major elements comprising a source of gas, such as gas tank 41 holding carbon dioxide under pressure, as denoted by pressure gauge 43. One supercritical, critical or near critical fluid of the present invention features carbon dioxide and entrainers and modifiers. Supercritical, critical or near critical fluid means further comprises entrainer tank 45. Entrainer tank 45 and gas tank 41 are in fluid communication with a pump 47 by conduits 51a, 51b, 51c and 51d. Metering pumps 53a and 53b control the flow of the gas and entainer to pump 47. Conditions to make a gas and/or gaseous mixture, such as a gas in which an entrainer or modifier has been added, a supercritical, critical or near critical fluid are known in the art and involve placing the gas or gaseous mixture under pressure, and/or at a temperature or a combination of temperature and pressure.

Pump 47 is in fluid communication by means of conduit 51e with heat exchanger 55. Heat exchanger 55 controls the temperature of the supercritical fluid. Heat exchanger 55 is in fluid communication with conveying means 15 by conduit 31 as previously described. Heat generated by the compression of gas is captured by heat exchanger 55. Heat exchanger 55 is in thermal communication with the conveying means 15 by heat exchange pipes 61a and 61b. Heat captured by heat exchanger 55 is used to heat conveying means 15.

Discharge means 21 is in fluid communication with the conveying means 15 for receiving the cellulosic biomass laden with the supercritical, critical or near critical gas, and discharging the gas to form a disrupted cellulosic biomass. Discharge means 21 is a rotating valve which rapidly brings a volume of laden biomass into fluid communication with discharge pipe 71. Discharge pipe 71 is in fluid communication with a turbine 73 which captures the kinetic energy of the expanding gas. Turbine 73 is coupled to an electric generator [not shown] to recover and recycle energy from the process. The valve continues to rotate emptying the biomass into at least one second vessel, represented by second vessel assembly 23.

The apparatus 11 further comprises at least one second vessel 23 in fluid communication with the discharge means 21 for receiving the disrupted cellulosic biomass and performing at least one processing step selected from the group consisting of hydrolysis and fermentation. These process steps are known in the art.

As depicted, second vessel assembly 23 comprises a hydrolysis vessel 23a and a fermentation vessel 23b. Hydrolysis vessel 23a is in fluid communication with discharge means 21. Hydrolysis vessel 23a has an opening controlled by valve 81 in fluid communication with fermentation vessel 23b. The processing steps in each vessel 23a and 23b form carbon dioxide. Vessels 23a and 23b are in fluid communication with supercritical, critical and near critical fluid means by conduit 85 plumbed to pump 47 to use the carbon dioxide formed. The processing steps further produce at least one product selected from the group consisting of ethanol and/or a bio-fuel, wood-based chemical and higher value materials. The fermentation vessel 23b has at least one opening controlled by valve 87 for discharging the product and any wastes. Where the product is ethanol, which is also used as an entrainer, a portion of the ethanol product is diverted to tank 45 by means of conduits [not shown].

A further embodiment of the present invention, directed to a method of making ethanol and/or one or more bio-fuels, wood-based chemical and higher value materials from a cellulosic biomass, will be described now with respect to the operation of apparatus 11. A cellulosic biomass is held in the one first vessel 13. The cellulosic biomass, if rigidly solid, such as wood chips, is sized appropriately for downstream valves, conduits, such as conduit 35 and auger 33. From first vessel 13, the biomass is discharged to conveying means 15 and a cellulosic biomass laden with a supercritical, critical or near critical fluid is formed. At discharging means 21 the gas from the cellulosic biomass laden with a supercritical, critical or near critical fluid is released to form a disrupted cellulosic biomass. The disrupted biomass is processed, by at least one step of hydrolysis or fermentation, to form at least one product selected from the group consisting of ethanol and/or a bio-fuel, wood-based chemical and higher value materials in second vessel assembly 23 and discharged at valve 87.

Gas formed or carried into the second vessel assembly 23 is returned to supercritical, critical or near critical fluid means 17 by conduit 85. Heat from compression steps is recycled to attain or maintain supercritical, critical or near critical conditions in the conveying means. Entrainers used in the process or formed in the process are recycled to tank 45. Kinetic energy generated during the explosive decompression is used to power an electric generator which electrical power is used to power aspects of the apparatus 11.

The method and apparatus 11 of the present invention can be operated in a batch, or semi-continuous or continuous process. Embodiments of the present invention are expected to yield conversion efficiencies of 23.25 percent for the pre-fermentation processing of white pine cubes, 18.13 percent for the processing of green red oak strips and 48.08 percent for the processing of newspaper strips. This leads to biomass recovery yields between 95 and 99 percent. The material, gases and entrainers are relatively non-toxic and are substantially contained.

Thus, while the present invention has been described with respect to preferred embodiments it will be recognized by those skilled in the art that such embodiments can be modified or altered and therefore the present invention should not be limited to the precise details but should encompass the subject matter of the claims which follow and their equivalents.

The invention claimed is:

1. An apparatus for processing cellulosic biomass to make ethanol and/or one or more bio-fuels, wood-based chemical and higher value materials comprising:
    a. at least one first vessel having at least one opening for receiving said cellulosic biomass and discharging a cellulosic biomass;
    b. conveying means in fluid communication with said at least one first vessel for receiving cellulosic biomass stored in said at least one first vessel, said conveying means engaging said first vessel to prevent discharge of a gas held under pressure to form a cellulosic biomass laden with a supercritical, critical or near critical gas;
    c. supercritical, critical or near critical fluid means in fluid communication with said conveying means for placing said cellulosic biomass held in conveying means in the presence of a supercritical, critical or near critical fluid selected from the group of gases comprising carbon dioxide and entrainers and modifiers;
    d. discharge means in fluid communication with said conveying means for receiving said cellulosic biomass laden with said a supercritical, critical or near critical gas, discharging said gas to form a disrupted cellulosic biomass;
    e. at least one second vessel in fluid communication with said discharge means for receiving said disrupted cellulosic biomass and performing at least one processing step selected from the group consisting of hydrolysis and fermentation and forming carbon dioxide, and at least one product selected from the group consisting of ethanol and/or a bio-fuel, wood-based chemical and higher value materials, said vessel having at least one opening for discharging said product and at least one gas discharge opening for discharging carbon dioxide wherein said second vessel gas discharge opening is in fluid communication with a gas recycling means for receiving said gas discharged in said second vessel and returning said gas to supercritical, critical or near critical conditions for reentry into said conveying means.

2. The apparatus of claim 1 wherein said supercritical, critical or near critical fluid means comprises a source of carbon dioxide.

3. The apparatus of claim 2 wherein said supercritical, critical or near critical fluid source is in thermal communication with a thermal exchanger for heating or cooling said carbon dioxide to desired supercritical, critical or near critical conditions.

4. The apparatus of claim 3 wherein said conveying means receives thermal energy from said thermal exchanger.

5. The apparatus of claim 1 wherein said supercritical, critical or near critical fluid means is in fluid communication with gas recycling means.

6. The apparatus of claim 1 wherein said gas recycling means comprises a compressor.

7. The apparatus of claim 1 wherein said conveying means is at least one auger held in a conduit.

8. The apparatus of claim 1 wherein said supercritical, critical or near critical fluid means comprises a source of entrainers and/or modifiers.

9. The apparatus of claim 8 wherein said entrainer and/or modifier is ethanol.

10. The apparatus of claim 1 wherein said discharge means is in fluid communication with turbine means for providing kinetic energy.

11. The apparatus of claim 10 wherein said kinetic energy powers an electric generator.

12. The apparatus of claim 1 wherein said at least one second vessel for receiving said disrupted cellulosic biomass and performing at least one processing step comprises a digestion vessel in fluid communication with a fermentation vessel, said digestion vessel for performing an enzymatic hydrolysis step on said disrupted cellulosic biomass to produce a digested biomass and cellulosic sugars, said fermentation vessel for receiving at least one of said cellulosic sugars or digested biomass to produce at least one of the group consisting of ethanol, a bio-fuel, a wood-based chemical and higher value material.

13. The apparatus of claim 1 wherein said at least one first vessel comprises at least two first vessels which first vessels are alternating in communication with said conveying means, to allow one first vessel to receive a cellulosic biomass while one first vessel is discharging cellulosic biomass to conveying means.

14. A method of making ethanol and/or one or more bio-fuels, wood-based chemical and higher value materials from a cellulosic biomass comprising the steps of
    a. providing at least one apparatus having a first vessel, conveying means, supercritical, critical or near critical fluid means, discharge means, and at least one second vessel;
       i. said at least one first vessel having at least one opening for receiving said cellulosic biomass and discharging a cellulosic biomass;
       ii. said conveying means in fluid communication with said at least one first vessel for receiving cellulosic biomass stored in said at least one first vessel, said conveying means engaging said first vessel to prevent discharge of a gas held under pressure to form a cellulosic biomass laden with a supercritical, critical or near critical gas;

iii. said supercritical, critical or near critical fluid means in fluid communication with said conveying means for placing said cellulosic biomass held in conveying means in the presence of a supercritical, critical or near critical fluid selected from the group of gases comprising carbon dioxide and entrainers and modifiers;

iv. said discharge means in fluid communication with said conveying means for receiving said cellulosic biomass laden with said supercritical, critical or near critical gas, discharging said gas to form a disrupted cellulosic biomass;

v. said at least one second vessel in fluid communication with said discharge means for receiving said disrupted cellulosic biomass and performing at least one processing step selected from the group consisting of hydrolysis and fermentation and forming carbon dioxide, and at least one product selected from the group consisting of ethanol and/or a bio-fuel, wood-based chemical and higher value materials, said vessel having at least one opening for discharging said product and at least one gas discharge opening for discharging carbon dioxide; and, vi. loading said first vessel with a cellulosic biomass and processing said cellulosic biomass through said conveying means, discharge means and said at least one second vessel with a gas under supercritical, critical or near critical conditions to produce ethanol and/or one or more bio-fuels, wood-based chemical and higher value materials wherein said second vessel gas discharge opening is in fluid communication with a gas recycling means for receiving said gas discharged in said second vessel and returning said gas to supercritical, critical or near critical conditions for reentry into said conveying means said method further comprising the step of recycling said gas.

15. The method of claim 14 wherein said supercritical, critical or near critical fluid means comprises a source of carbon dioxide.

16. The method of claim 15 wherein said supercritical, critical or near critical fluid source is in thermal communication with a thermal exchanger for heating or cooling said carbon dioxide to desired supercritical, critical or near critical conditions.

17. The method of claim 16 wherein said conveying means receives thermal energy from said thermal exchanger.

18. The method of claim 14 wherein said supercritical, critical or near critical fluid means is in fluid communication with gas recycling means.

19. The method of claim 14 wherein said gas recycling means comprises a compressor and said method further comprises the step of compressing said carbon dioxide.

20. The method of claim 14 wherein said conveying means is at least one auger held in a conduit.

21. The method of claim 14 wherein said supercritical, critical or near critical fluid means comprises a source of entrainers and/or modifiers.

22. The method of claim 21 wherein said entrainer and/or modifier is ethanol.

23. The method of claim 14 wherein said discharge means is in fluid communication with turbine means for providing kinetic energy.

24. The method of claim 23 wherein said kinetic energy powers an electric generator.

25. The method of claim 14 wherein said at least one second vessel for receiving said disrupted cellulosic biomass and performing at least one processing step comprises a digestion vessel in fluid communication with a fermentation vessel, said digestion vessel for performing an enzymatic hydrolysis step on said disrupted cellulosic biomass to produce a digested biomass and cellulosic sugars, said fermentation vessel for receiving at least one of said cellulosic sugars or digested biomass to produce at least one of the group consisting of ethanol, a bio-fuel, a wood-based chemical and higher value material.

26. The method of claim 14 wherein said at least one first vessel comprises at least two first vessels which first vessels are alternating in communication with said conveying means, to allow one first vessel to receive a cellulosic biomass while one first vessel is discharging cellulosic biomass to conveying means.

* * * * *